(No Model.) 2 Sheets—Sheet 2.
E. W. COOKE.
SHAFT HANGER.
No. 458,731. Patented Sept. 1, 1891.
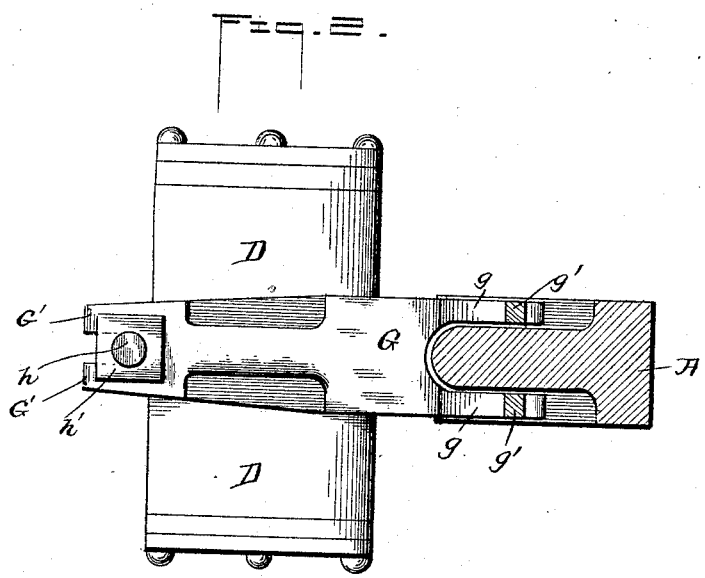
WITNESSES:
INVENTOR

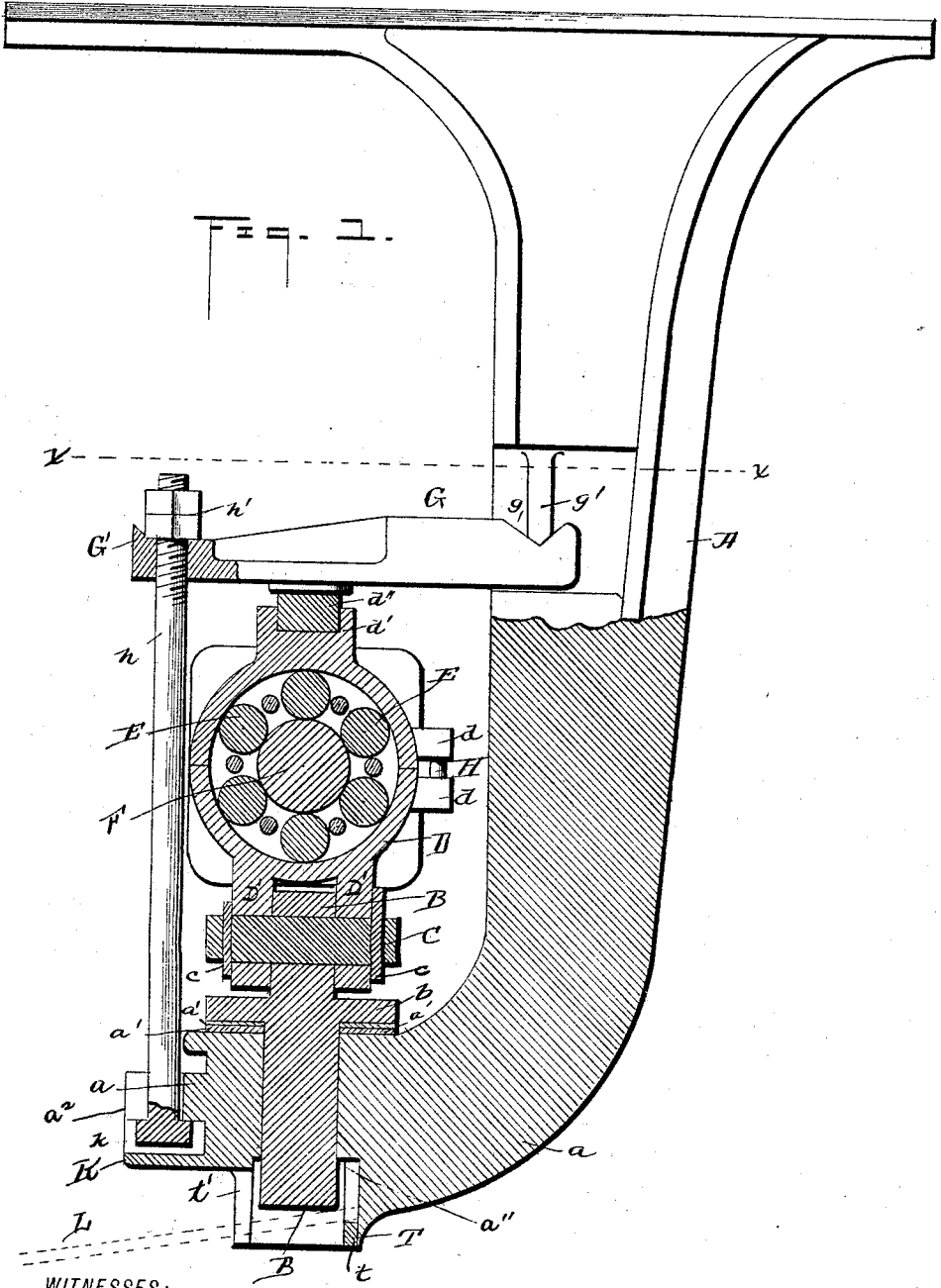

UNITED STATES PATENT OFFICE.

ERNEST WILLIAM COOKE, OF WESTERN SPRINGS, ILLINOIS, ASSIGNOR TO THE AMERICAN ROLLER BEARING COMPANY, OF SAME PLACE.

SHAFT-HANGER.

SPECIFICATION forming part of Letters Patent No. 458,731, dated September 1, 1891.

Application filed November 12, 1890. Serial No. 371,209. (No model.)

*To all whom it may concern:*

Be it known that I, ERNEST WILLIAM COOKE, a citizen of the United States, residing at Western Springs, in the county of Cook and State of Illinois, have invented a certain new and useful Improvement in Shaft-Hangers, of which the following is a full, clear, and exact description.

My present invention has relation, particularly, to certain new and useful improvements upon shaft-hangers; and it consists in certain novel features of construction that will be hereinafter fully described, and pointed out in the appended claims.

Referring to the annexed drawings, Figure 1 is a vertical sectional view of my improved device, and Fig. 2 is a plan view on the line $x\ x$ of Fig. 1.

In the drawings, the letter A designates a shaft-support, which may be either hung from the ceiling or mounted on a vertical standard, said support being provided at its lower end with the usual short horizontal extension or arm $a$. Formed vertically through the arm $a$ is a socket $a''$, wherein fits a knuckle B, provided about midway of its length with an annular flange $b$, which rests, through the medium of suitable interposed washers $a'$, upon the upper side of the said arm $a$.

The upper end of the knuckle B is provided with a horizontal aperture, through which passes a pivotal pin C, said pin C also passing through ears D', formed upon the lower portion of the journal-box D, the said ears embracing upper portion of knuckle B and serving to pivotally connect the box to the upper end of the same, two pins $c$ being inserted in the ends of the pin C to prevent its withdrawal or displacement. The two sections of the journal-box are provided with horizontal ears $d$ near their meeting edges, through which ears vertical connecting-pins H pass to connect the parts of the box and hold them in alignment.

In the box are journaled a series of rollers E, which bear upon the shaft F, and upon the upper box is formed a tubular socket $d'$, in which a rubber cushion $d''$ is secured.

Resting upon the rubber cushion on top of the box is a horizontal lever G, which is bifurcated at its rear end, so as to embrace the main arm of the hanger. In the upper edges of the rear bifurcated parts of this lever are formed notches $g$, adapted to engage under lateral lugs $g'$, formed upon the hanger. The forward end of this lever is vertically bifurcated or slotted for the reception of the upper end of the adjusting or clamping bolt $h$. A projection G' is made on the end of the bifurcated lever G, in order to form an abutment for the adjusting-nuts $h'$ upon the bolt, and thereby prevent the bolt leaving the slot. The head of the bolt at the lower end thereof is inserted in a shouldered recess $k$, formed in a forwardly-projecting lug K on the hanger-arm, the head of said bolt engaging under the shoulders $a^2$, as shown in the drawings. The advantage of thus securing the head of the bolt in the hanger is that it will be thereby prevented from falling out or becoming displaced when the nuts are removed from its upper end.

A short tubular projection T is formed on the under side of the arm $a$ around knuckle B and projecting below the same. A vertical slot $t'$ is formed in one side of this tubular projection, and upon the interior of the said projection opposite the slot $t'$ is formed a shoulder $t$.

My object in resting-knuckle B, as shown and described, is that by this means I may vertically adjust the journal-box, as by using a lever, such as shown on drawings at L in dotted lines. This lever L is inserted under knuckle B, its rear end resting on the interior shoulder of the short arm, as shown at Fig. 1, and by simply raising it the knuckle B will be raised and an additional washer placed under the flange $b$ or one removed therefrom.

Having thus fully described my invention, what I claim herein as new, and desire to secure by Letters Patent of the United States, is—

1. A shaft-hanger provided with a lower horizontal arm having a socket and a tubular recessed projection having a shoulder formed therein, a flanged knuckle seated in said socket and provided with means for securing it to the under side of the journal-box, and one or more washers under the flange of said knuckle, an upper horizontal arm pivoted to the hanger and provided with a projection at its under side adapted to aid in holding the box in place, and means for connecting the two horizontal arms, as set forth.

2. A shaft-hanger provided at its lower portion with a tubular projection recessed at its outer end, said hanger having in its front upper portion a recess with downwardly-extending lugs, a vertical bolt having in its lower headed end inserted in a shouldered recess in a projecting lug on the hanger-arm, a horizontal lever notched at its rear end and engaging the aforesaid lugs and bifurcated at its front end to form a seat for the vertical bolt, and nuts upon said bolt, as set forth.

3. A shaft-hanger provided at its lower portion with a horizontal arm or extension and having in its upper portion a recess with lugs therein, a vertical bolt seated in the extremity of the horizontal extension and adapted to receive nuts at its upper end, and a horizontal lever engaging the aforesaid lugs, bifurcated at its front end, and having projections G' for the nuts to bear against, as set forth.

4. A shaft-hanger provided with a lower arm having a socket and a tubular projection having a shoulder therein, a journal-box, a flanged knuckle seated in said socket and provided with means for securing it to the under side of the journal-box, a vertical bolt seated in the extremity of the horizontal extension and adapted to receive nuts at its upper end, and a horizontal lever engaging the lugs in the upper portion of the hanger, said lever being bifurcated at its front end and having projections G' for the nuts to bear against, as set forth.

In testimony whereof I have hereunto set my hand in the presence of two witnesses.

ERNEST WILLIAM COOKE.

Witnesses:
T. J. THOMPSON,
WILLIAM C. BOYDEN.